June 10, 1941.  E. A. HARTUNG  2,244,693
PIPE AND PIPE FLANGE TONGS
Filed Oct. 21, 1938   3 Sheets-Sheet 1
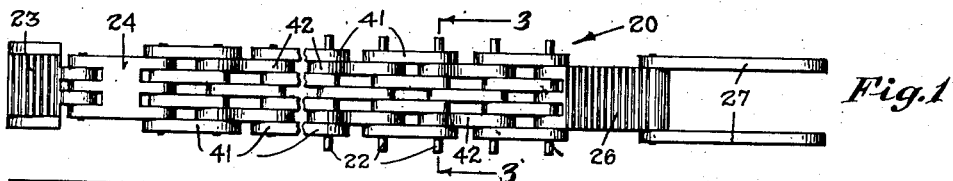
Fig.1
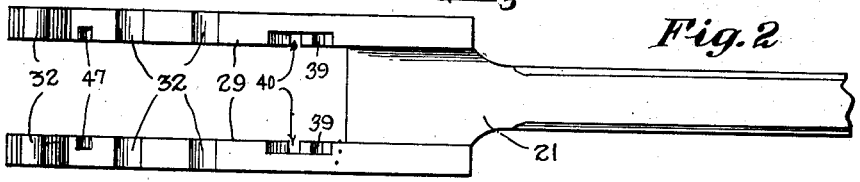
Fig.2
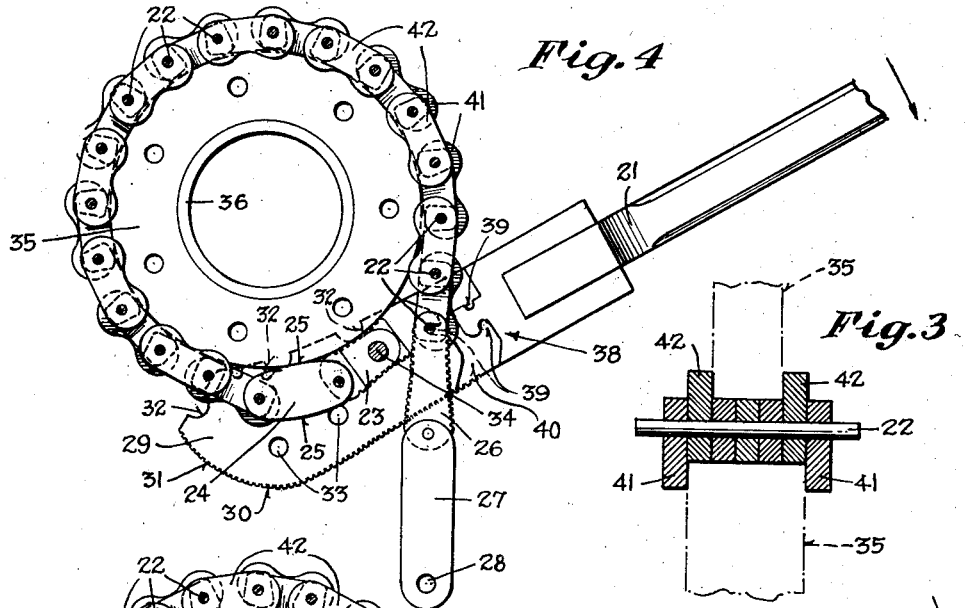
Fig.3
Fig.4
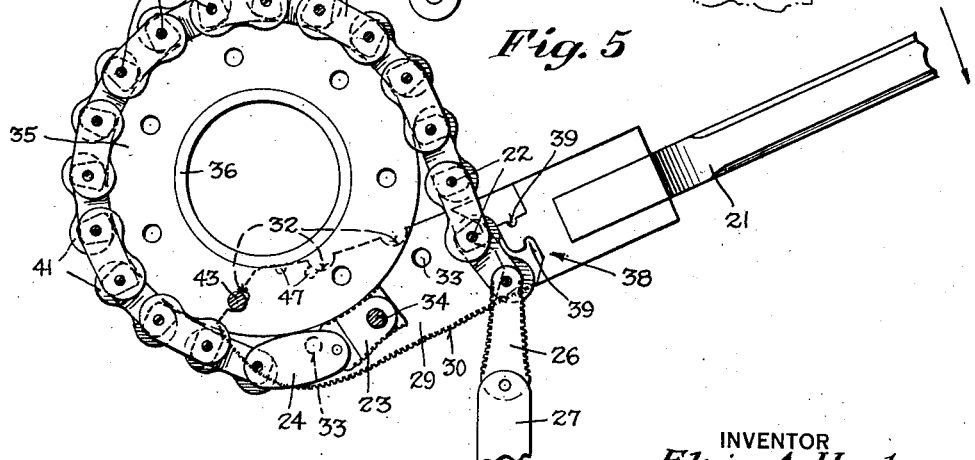
Fig.5
INVENTOR
Elvin A. Hartung
BY
ATTORNEY June 10, 1941.  E. A. HARTUNG  2,244,693
PIPE AND PIPE FLANGE TONGS
Filed Oct. 21, 1938   3 Sheets-Sheet 2

INVENTOR
Elvin A. Hartung
BY
Arthur A. Johnson
ATTORNEY

June 10, 1941.  E. A. HARTUNG  2,244,693
PIPE AND PIPE FLANGE TONGS
Filed Oct. 21, 1938  3 Sheets-Sheet 3

INVENTOR
*Elvin A. Hartung*
BY
ATTORNEY

Patented June 10, 1941

2,244,693

UNITED STATES PATENT OFFICE 2,244,693

PIPE AND PIPE FLANGE TONGS

Elvin A. Hartung, New London, Conn.

Application October 21, 1938, Serial No. 236,177

7 Claims. (Cl. 81—66)

This invention relates to chain tongs, and more particularly, to tongs adapted for use with pipes and pipe flanges, particularly those of larger sizes.

Chain tongs have been employed heretofore for putting on and taking off pipe flanges as well as for turning the pipe itself. With the use of chain tongs on pipe flanges, it has been difficult to keep the chain from slipping laterally off the flange, with the resulting inconvenience and sometimes personal injury to the user of the tongs.

One of the more important features of the present invention is the provision of the chain used in the chain tongs with projections which engage over the opposite faces of a pipe flange and positively prevent the chain from laterally slipping off the flange, so long as the chain is reasonably close to the flange. Since pipe flanges vary in thickness in accordance with the size of the pipe with which they are to be used, to assure that the chain will not slip off laterally whether the pipe flange be thick or thin, two rows of projections are provided on the chain— one on each side thereof, the projections on one side of the chain being wider spaced apart than those on the opposite side. With this construction, it is merely necessary to reverse the chain with reference to the lever which carries it to use the tongs on a thick or thin flange.

In starting a flange to remove it from the pipe, the force required is frequently greater than can be frictionally transmitted to the flange by the chain, and hence it is not an uncommon practice to place pins or bolts in the bolt holes of the flange, and, by using a crowbar, attempt to rotate the flange. The force being applied to the pins on one end thereof tends to cause the crowbar to slip or pull out one or both of the pins used, and when this happens personal injury may result to the mechanic and possibly to those close by, for the pulled out pin may be hurled through the air, and this has happened, with serious injury being inflicted.

The same operation is used in finishing the tightening of the flange on the pipe, and here the danger is as great, especially when it is necessary to drive the flange on the pipe so as to make it tight and so as to match up the bolt holes on one pipe flange with those of the pipe flange which it is to engage.

Another difficulty is that when the force is applied to the pins by a crowbar, there is a radial component of the force outwardly of the flange, which has, on occasion, caused the bolt or pin to break the bolt hole through to the periphery of the flange.

According to the present invention, no additional implement, such as a crowbar, is needed to start or drive home the flange. This is accomplished by so arranging the lever of the tongs that portions of the head of the lever straddle and lie adjacent the face of the flange, and are shaped to engage and preferably receive a bolt or pin which may be placed in one of the bolt holes of the flange while the lever is held to and guided on the flange by the chain. For a normal condition, the chain may remain around the flange in the same condition as when it was used to frictionally rotate the flange on the pipe, and it is merely necessary to insert the pin in the bolt hole and bring the end of the lever into position to engage the pin. When this condition prevails, torque is applied to the flange, both by the chain and by the pin, distributing the load around the periphery of the flange as well as against the pin. The force applied to the flange by the pin is arcuate with the center of the arc substantially at the center of the flange. Hence, the danger of breaking-out the bolt hole is eliminated, and the danger of pulling out the pin is eliminated by the engagement of the pin at both projecting ends.

When the flange has been moved to the limit of the stroke of the lever as determined by obstructions in the way of the lever, the lever is moved in the opposite direction with the chain slipping around the flange until the end of the lever is brought to the next bolt hole. The bolt or pin is then shifted and the flange turned again.

To provide for starting and finishing an extra hard flange, the present invention so arranges the chain and lever that one end of the chain may be positively coupled, as by a pin extending through this chain and a bolt hole of a flange, to the flange while the other end of the chain is anchored on the lever, and the end of the lever engages another pin or bolt placed in another hole in the flange. In this situation, the flange is rotated by torsion applied to two bolts or pins in addition to the gripping action of the chain on the flange, and the force is always substantially in an arcuate path concentric with the flange.

In addition, the tool of the present invention may be employed directly on the surface of the pipe as a pipe wrench. To facilitate this, a part of the lever is serrated, and the handle or lever is arranged so that the chain may be wrapped around the pipe and the lever will be held to the pipe. The serrated surface of the lever bites into the pipe and causes the pipe to rotate when the lever is operated.

Furthermore, the links of the chain in one form of the invention are provided with teeth to insure a more positive engagement between the chain and the peripheral surface engaged by the chain as the former grips the surface when the lever is operated.

The teeth of the links, according to the present invention, are adapted to be also used to insure a more positive engagement between the chain and a pipe flange, particularly where the tool is to be used on a pipe flange lying closely adjacent another pipe flange preventing the lever from straddling the flange to be operated upon. In this situation, the side of the chain is selected on which the projections are spaced apart less than the thickness of the flange, so that the projections engage the peripheral surface of the flange rather than the opposite faces thereof. The chain is wrapped around the periphery of the flange with the teeth of the links engaging the same, the flange being rotated upon operation of the lever as hereinbefore mentioned.

Thus it will be seen that the present invention provides a single implement or tool which may be used as a pipe wrench or as a wrench to quickly turn on and off a pipe flange, and also to start and finish the operation of removing or applying the flange to the pipe even where the flange is tightly seized to the pipe or must be driven thereon with unusual force.

Other features and advantages will hereinafter appear.

In the drawings:

Figure 1 is a plan view of one form of the chain of the present invention.

Fig. 2 is a plan view of the lever of the present invention with a portion of the handle cut away.

Fig. 3 is a sectional view taken along line 3—3 of Fig. 1, showing in broken lines flanges having different thickness accommodated by the chain.

Fig. 4 is a view showing one form of the chain of the present invention secured to the lever and mounted on a flange for use, with a marginal row of links and one plate of the head of the lever removed.

Fig. 5 is a view similar to Fig. 4, showing the lever positively engaging a pin carried by the flange for applying an additional force to the same.

Figure 6:
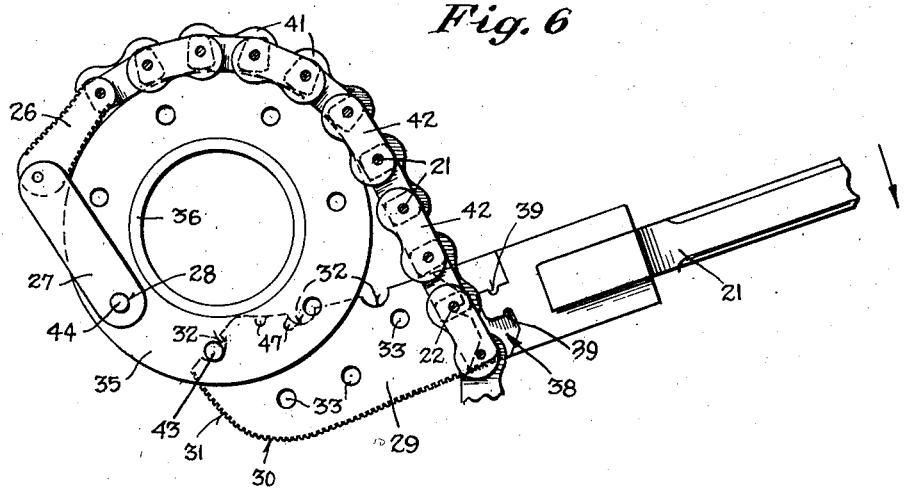
Fig. 6 is another view similar to Fig. 4, showing the chain connected to the flange and lever with the lever engaging a pin carried by the flange for applying an even greater force to the same.

In the preferred embodiment of the invention, a belt chain 20 comprising a plurality of flat links having grip surfaces on opposite sides thereof, is removably anchored at opposite end portions to a lever or handle 21.

The chain 20, referring now to Fig. 1, preferably comprises a plurality of staggered flat parallel disposed links, the ends of which are pivotally interconnected by suitable pins 22.

Pivotally connected to one end of the chain 20 is a digited dog or bite link 23 having serrated faces on opposite sides thereof.

In the now preferred form of the invention, a cam link 24, provided with convex faces 25 on opposite sides thereof, is pivotally interposed between the bite link 23 and the end of the chain proper.

The opposite end of the chain 20 is provided with an enlarged bite link 26 pivotally secured at one end to the adjacent link in the end of the chain, as well as to a pair of elongated parallel links 27, each provided adjacent the free ends thereof with aligned apertures 28.

The handle or lever 21 is provided preferably adjacent an end thereof with a head comprising a pair of plates 29 forming parallel coextensive tines. The plates 29 may be separately formed and then suitably secured to the end of the lever 21, or, if desired, may be integral therewith. An edge of each plate is provided with suitable serrations or teeth 30 forming a biting contact jaw on opposite sides of the head, each jaw being bevelled as at 31 to form convex faces at the open ends thereof.

The opposite edge of each plate or tine is provided with aligned spaced grooves 32. The faces of each plate are provided with aligned spaced apertures 33, which form, as will be later described, means for selectively anchoring an end of the chain 20 to the lever 21.

The wrench of the present invention is adapted for use in connection with pipes and conduits of various size and is particularly adapted for use on pipe flanges employed on pipes and other tubular casings having large diameters and not conveniently interconnected by the usual means. These pipe flanges generally comprise flanged sleeves having an internal thread to engage the external threads of the pipe. The flanges are formed with spaced annular bolt-receiving apertures, and, in connecting two pipe lengths together, the adjacent flanges are placed face to face with the bolt-receiving apertures in alignment, whereupon the flanges are bolted together to complete the union.

The bolt-receiving apertures of the flanges have been previously used to finish and start the flanges when installing and removing flanges from pipes as pins could be loosely inserted in the bolt holes, and a torque applied to the flange by means of a crowbar or the like disposed transversely of the one face of the flange and engaging the pins held within selective bolt-receiving holes. This method of operating on the flange was extremely dangerous and often resulted in personal injury to the workman, as many times the pins would be pulled out or the bar would slip off the pins due to the strain placed on the one projecting end of the pins. If the pins were pulled out, many times they would be hurled through the air for substantial distances causing injury not only to workmen but to bystanders as well.

Besides, if the joint were hard to start, the force being applied by the crowbar or the like having a substantial radial component outwardly of the flange would frequently break the bolt hole through to the periphery of the flange.

Heretofore, before finishing and after starting the flange in applying and removing the same from the pipe, chain tongs were employed to engage the periphery of the flange. With the use of these tongs it frequently occurred that the chain slipped off the flange laterally, making the operation difficult and many times resulting in personal injury to the workman using the tongs.

Thus, it will be seen that, it was frequently necessary heretofore to employ two tools to apply and remove the flanges. According to the present invention, a single tool is needed to complete the entire operation, and with the device of the present invention, lateral slipping of the chain is avoided and breaking out of the bolt holes of the flange is prevented.

In using the device of the present invention when operating on a pipe flange after the same has been started and before finishing, the bite link 23, referring now to Fig. 4, is pivotally secured within the slot in the head formed by the plates 29 by a pin 34, the opposite ends of which are received within a pair of the aligned apertures 33. The plates are placed in the position as shown on opposite sides of the flange, with the chain 20 disposed about the periphery of the flange 35 of the connector, the threads of which now engage the threads of the pipe 36. The free end of the chain is threaded between the plates 29 and the oppositely extending ends of one of the pivot pins 22, depending on the diameter of the flange to be operated upon, are placed in slots of keeper members 38. The keeper members may be formed separately and suitably secured on the inner faces of the plates 29, but, preferably as shown, are formed integral therewith. The keeper members 38 comprise hooked slots 39, formed in the inner faces of the plates 29, communicating with a slot 40 transversely formed in each inner face of the plates.

The flange may now be screwed onto the pipe by the application of a force on the lever in the direction of the arrow in Fig. 4.

It will be seen that such a force will cause the chain 20 to grip and apply to the periphery of the flange a torsional force and securely thread the flange to the end of the pipe. As the links of the chain 20 engage and grip the periphery of the flange, the convex surface-engaging face 25 of the cam link 24, due to its engagement with the periphery of the flange, causes the end of the cam link, pivotally secured to the bite link 23, to move away from the periphery of the flange, thereby causing one of the serrated faces of the bite link to bite into the periphery of the flange. This insures a more positive grip on the flange, and augments the frictional engagement of the links of the chain and prevents the same from slipping around the periphery of the flange.

To prevent the chain from sliding off the flange, parallel rows of the links of the chain 20 are interconnected in such a manner that they present, longitudinally of the chain, transversely extending projections on opposite sides thereof. Preferably, as shown, the two marginal rows of links 41 are pivotally interconnected with the adjacent links 42 on lines spaced on opposite sides from the center line of each respective link so that the links 41 present spaced transversely extending projections on one side of the chain while the links 42 present similar, although inwardly spaced projections, on the opposite side of the chain.

These projections, as will now be understood, provide an elongated flange-receiving pocket on opposite sides of the chain. The individual projections, formed by the eccentric interconnection of the links, engage the opposite faces of the flange, thereby preventing the chain from any side-slipping due to lateral forces applied to the handle or the chain itself.

The links 41, as they are laterally displaced outward of the links 42, form, on the one side of the chain, parallel rows of projections wider spaced apart than the projections formed on the opposite side of the chain by the links 42. This construction permits, as will now be understood, the chain to be used, by merely reversing the same, on flanges of different depths or thicknesses without the danger of the chain laterally slipping from the flange operated upon.

To permit an even greater torsional force to be applied to the connection, as where it is desired to start a flange seized to the pipe or to insure that a flange is tightly threaded onto the pipe, the wrench may be used as illustrated in Fig. 5.

In this use of the device of the present invention, the bite link 23 is pivotally connected to the handle 21 by inserting the pin 34 in the intermediate aligned apertures, the opposite end of the chain being secured in the same manner as described when the wrench was used, as shown in Fig. 4.

In the now described use, however, a pin 43 is placed in one of the bolt-receiving apertures of the flange 35, and the handle 21 is adjusted until opposite ends of the pin 43 are received within the notches or grooves 32 adjacent the free ends of the plates 29, and a force applied to the handle 21 in the manner as it was applied in Fig. 4.

When the wrench is applied in this manner of operation, the bite link 23, during the actuation of the cam link 24, functions in the same manner as previously explained. A greater torsional force may be applied to the flange, however, without fear of any peripheral slippage due to the direct engagement of the pin 43 with the lever 21, as has been explained. The danger of the pin being pulled out of the hole is entirely eliminated as the head of the lever engages both ends of the pin.

It will be seen that the pin, in addition to forming a pivot point about which the lever may move, also takes a torsional force due to the fact that the lever pivots relative to the chain about the point established by the pin 34. As force applied to the pin is arcuate, with the center of the arc substantially at the center of the flange, any radial component of the force against the pin is negligible, and all danger of the bolt holes of the flange breaking out is eliminated.

Furthermore, it will be seen that when the device is used as illustrated in Fig. 5, the chain functions primarily as a means for supporting the lever in position on the flange for operation. Thus, the chain may be used principally as a support for the lever—rotation of the flange being effected solely by the lever as the same pivotally moves about the pin 34 into engagement with the pin 43 carried by one of the bolt holes of the flange.

When the flange has been moved to the limit of the stroke of the lever, as determined by obstructions in the way of the lever, the lever is moved in the opposite direction, with the chain slipping around the flange until the end of the lever is brought to the next bolt hole. The bolt or pin is then shifted and the flange turned again.

When the flange is extremely difficult to start or finish, the wrench may be employed as illustrated in Fig. 6. In this use of the wrench, the one end of the chain 20 is connected to the flange 35 by pivotally connecting the free ends of the elongated links 27 on opposite sides of the same by inserting a suitable pin 44 in a selected bolt-receiving aperture of the flange and disposing the opposite ends thereof in the apertures 28 of the links 27. The opposite end of the chain is threaded between the plates 29 and the oppositely extending ends of one of the pins 22 again placed within aligned slots 39 of the keepers 38. The handle 21 is adjusted so that the selected notches 32 again engage the pin 43, whereupon a force is applied to the handle in the direction of the arrow in Fig. 6.

In this form of use, as the strain is distributed between the two pins employed as well as the links of the chain 20, the danger of one or both of the pins shearing off is negligible. Furthermore, as both of the pins are engaged on opposite sides of the flange, the danger of one or more of the pins pulling out is entirely eliminated. The force applied to the pins, as explained in the previously discussed use of the tool, is arcuate so that the danger of one or more of the bolt holes, within which the pins are disposed, breaking out, is also eliminated.

Figure 7:
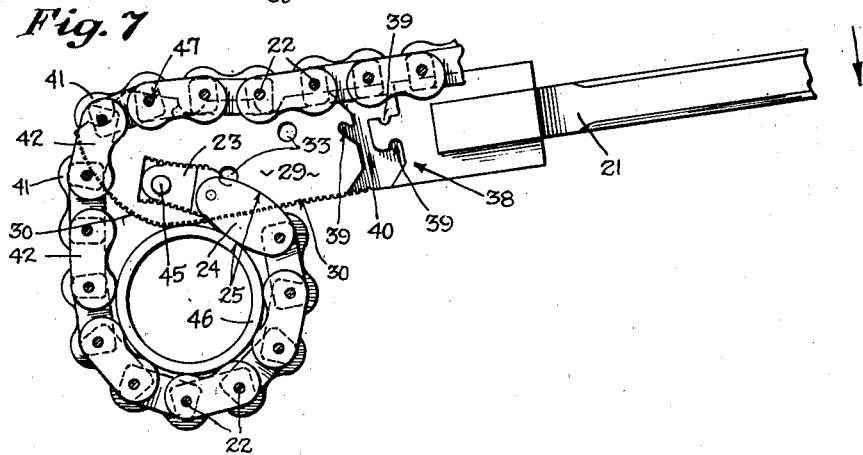
Fig. 7 is a view of the device of the present invention used as a pipe wrench to apply a right-hand turn to the pipe with one plate of the head removed.

The wrench of the present invention may also be used as a pipe wrench by merely changing the connection of the chain 20 to the handle 21, which change is very quickly and easily accomplished. If it is desired to use the wrench on a pipe or the like, the chain may be connected to the handle, as shown in Fig. 7. As shown, the bite link 23 is pivotally connected to the inner faces of the plates 29 by means of a suitable pivot pin 45, the opposite ends of which are received in an aligned pair of the apertures 33.

The chain is disposed about the periphery of the pipe 46 with the serrated edge of the plates 29 held in contact with the surface of the pipe by securing the opposite end of the chain to the lever 21 by placing the oppositely extending ends of one of the pins 22 in keeper notches 47 formed in the inner faces of the plates 29 adjacent the notched edges thereof. A clockwise torsional force or right-hand turn may be applied to the pipe by exerting a force on the handle 21 in the direction of the arrow in Fig. 7. The serrated edge faces of the plates 29 form the biting jaws of the wrench as the periphery of the pipe is gripped by the links of the chain 20, and augment the frictional engagement of the same.

Figure 8:
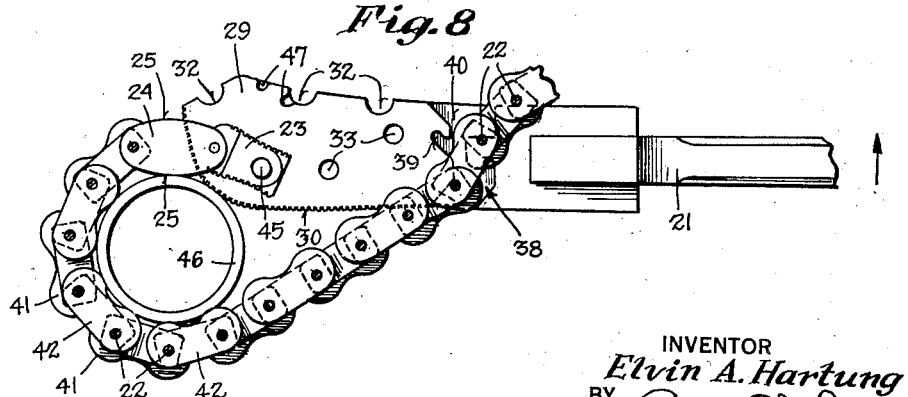
Fig. 8 is a view similar to Fig. 7, but showing the location of the elements of the device of the present invention to apply a left-hand turn to the pipe.

To apply a counterclockwise torsional force or left-hand turn on the pipe 46, it is merely necessary to release the ends of the pin 22 from the keeper notches 47 and place the chain 20 about the periphery of the pipe, as shown in Fig. 8, the free end of the chain now being secured by placing the oppositely extending ends of one of the pins 22 in the notch 39 of the keeper 38. As will now be understood, the counterclockwise torsional force may be applied to the pipe 46 by exerting force on the handle 21 in the direction of the arrow in Fig. 8.

It should be noted that when the device of the present invention is used as a pipe wrench, the bite link 23 or 26 play no part in the gripping action of the wrench. In this use, the serrated faces of the plates 29 apply the bite, and the individual links of the chain 20 grip the periphery of the pipe.

Figure 9:
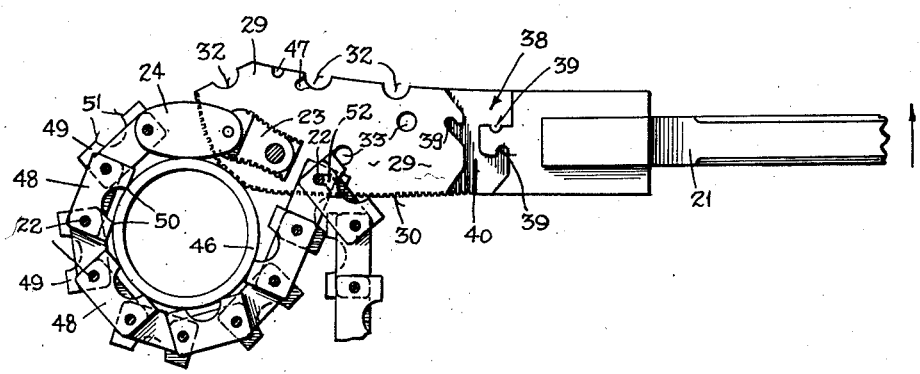
Fig. 9 is a view of the device of the present invention similar to Fig. 8, but showing a modified form of the chain.

There is shown in Fig. 9, a modified form of the invention, in which, to increase the frictional engagement between the chain and peripheral surface of the pipe or the like, the links 48 and 49 of the chain may be formed as shown in the figure referred to. The links 48 and 49 of the chain, as shown in this figure, are provided with oppositely extending teeth 50 and 51 respectively, intermediate the ends thereof formed by removing a semicircular piece from each link. The links are pivotally interconnected to form the chain as are the links 41 and 42 of the chain previously described, and provide the lateral flange face-engaging projections on the opposite sides of the chain.

It will be seen that when the chain is formed in this manner, that the teeth of the individual links will bite into the periphery of the pipe, thereby insuring a more positive grip thereon.

In the use and form of the device of the present invention as shown by Fig. 9, the bite link 23 is secured between the plates 29 as explained during the description of Fig. 8, and the chain wrapped around the periphery of the pipe—the free end portion of the chain being secured to the lever by placing the extending ends of a selected pin 22 in the hooked slot 52 formed in each plate 29. The slots 52, although they have been shown only in Fig. 9, may be used as keepers for detachably anchoring an end portion of the chain in any of the other illustrated uses of the device where an advantage can be obtained by so anchoring the chain. The slots 52 preferably are formed adjacent the free ends of the plates and permit a greater perimetrical engagement of the pipe 46 by the chain. This construction insures a better frictional engagement of the chain with the pipe which is particularly important where the pipe operated upon has a substantially small diameter. This disposition of the chain distributes the force applied to the pipe about substantially the entire periphery of the same, and eliminates strains many times placed on the smaller diameter pipes where only partial engagement between the pipe and chain can be had.

As both forms of the chain have gripping surfaces on either side, the chain may be very conveniently reversed, no particular attention being paid to what side of the chain is to be placed in contact with the periphery of the pipe.

Figure 10:
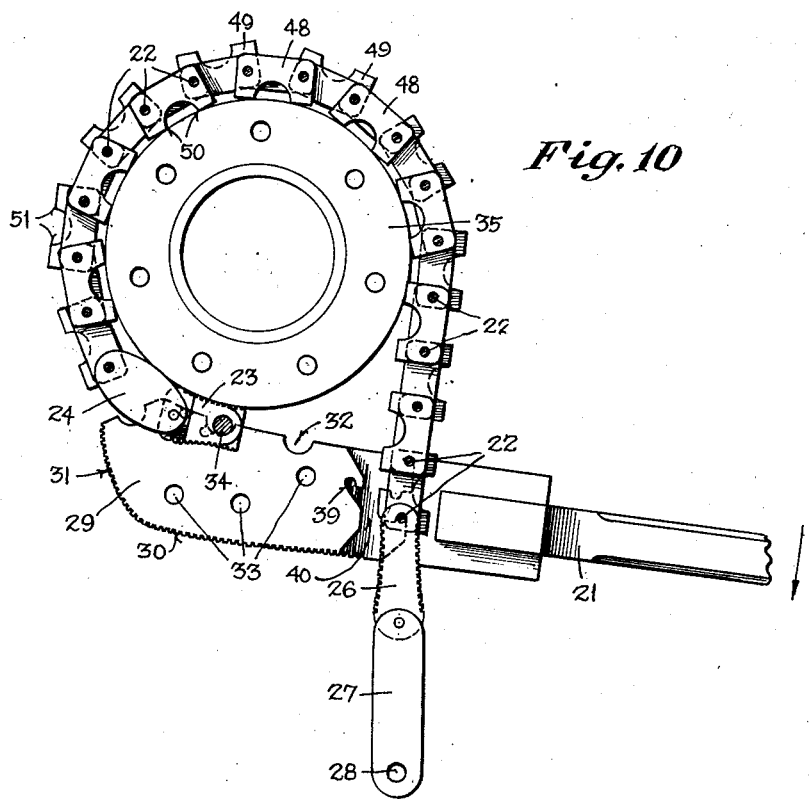
Fig. 10 is a view similar to Fig. 4, showing the modified form of the chain operating on a flange.

In some situations, it will be impossible to use the device of the present invention on pipe flanges as has been hereinbefore explained, due to the fact that in some installations the adjacent faces of the flanges will be in such proximity as to prevent the plates 29 of the lever from straddling the flange to be operated upon. In this situation, the chain, as illustrated in Fig. 9, can be very effectively used—the chain in this operation being connected to the lever, as illustrated in Fig. 10.

In this use, the bite link 23 is detachably secured to the head of the lever 21 by placing oppositely extending ends of the pin 34 in a pair of aligned notches and wrapping the chain about the peripheral surface of the flange and securing the free end portion of the chain to the inner faces of the plates 29 by locking the extending ends of a selected pivot pin 22 in the hooked slots of the keeper member.

The lateral flange face-engaging projections of the chain in this operation do not engage the opposite faces of the flange, but, rather, engage the peripheral surface of the same. As these projections are spaced farther apart on one side of the chain than the other, the side of the chain will be selected to engage the periphery of the flange that has the projections spaced apart less than the thickness of the flange itself. With the projections formed by the links engaging the peripheral surface of the flange rather than the opposite faces thereof, it will be seen that the teeth formed on the links will bite into the surface engaged and insure a more positive engagement between the chain and the periphery of the flange. The bite link 23, in this use, is brought into biting engagement with the peripheral flange by the cam link 24 as the chain is tightened about the peripheral surface of the flange upon operation of the lever 21.

It will be understood that care must be taken that no lateral forces are exerted against the lever or the chain itself to prevent the chain from laterally slipping off the periphery of the flange.

It will be seen that the device of the present invention provides a very easily and quickly adjustable flange and pipe wrench adapted to be used on pipes and flanges of different diameters with equal facility. The use of the device of the present invention eliminates the necessity of employing two tools to start and finish the operation of removing or applying the flange to the pipe even where the flange is tightly seized to the pipe or must be driven thereon with unusual force.

Variations and modifications may be made within the scope of this invention and portions of the improvements may be used without others.

I claim:

1. A wrench adapted to operate on a pipe flange and comprising a lever; and a flexible articulate member adjustably connected to the lever to embrace the flange and frictionally grip the periphery thereof when tightened against the flange by application of force to the lever, said articulate member being provided on opposite sides thereof with spaced parallel lateral projections overlapping the faces of the flange to prevent the articulate member from slipping laterally off the flange in use, the projections being further spaced apart on one side of said member than on the other so that by reversing the member either of two flanges of different thickness may be closely engaged by the said lateral projections.

2. A wrench adapted to operate on a pipe flange and comprising a lever; and a chain including grip links adjustably connected to the lever to embrace the flange and frictionally grip the periphery thereof when tightened against the flange by application of force to the lever, the links of said chain forming on opposite sides thereof spaced parallel lateral projections overlapping the faces of the flange to prevent the chain from slipping laterally off the flange in use so that by reversing the chain either of two flanges of different thickness may be closely engaged by the said lateral projections.

3. In chain tongs for pipe flanges having an annular row of spaced bolt holes, a lever; a chain adapted to wrap around the peripheral surface of the flange and including grip links; and means connecting the chain to the lever to cause the chain to frictionally grip the periphery of the flange when the lever is operated, said lever having a plurality of spaced notches formed at one end thereof, a selected notch receiving and engaging a pin carried by one of the bolt holes in the flange to positively engage and rotate the flange by force applied by the lever when the frictional engagement between the chain and flange is insufficient to drive the flange home or to start it from set position when the lever is still held to the flange by the chain.

4. In chain tongs for pipe flanges having an annular row of spaced bolt holes, a lever; a chain adapted to wrap around the peripheral surface of the flange and including grip links; means connecting the chain to the lever to cause the chain to frictionally grip the periphery of the flange when the lever is operated; and means on the lever adapted to engage a pin carried by one of the bolt holes in the flange to positively engage and rotate the flange by force applied by the lever when the frictional engagement between the chain and flange is insufficient to drive the flange home or to start it from set position when the lever is still held to the flange by the chain, the pin-engaging means on the lever being in advance of the points of connection of the chain to the lever and having a surface substantially radial of the pipe so that the positive force of the lever is arcuate of the flange without an outward radial component which might tend to break out the bolt hole carrying said pin.

5. In a pipe wrench of the type described, a lever; a pair of flat parallel tines at one end thereof; toothed jaws formed on said tines; and a chain having one end comprising a solid link pivoted in the space between said tines and adjacent said jaws and adapted to be wrapped around and engage the peripheral surface of a pipe, the free end portion disposed between said tines and being adjustably secured to the inner faces of the same, said jaws being formed to increase the bite of the chain on the pipe and themselves to bite into the pipe as the lever is moved in a direction to turn the pipe relative to a threaded member receiving it.

6. In a pipe wrench of the type described, a lever; a pair of flat parallel tines at one end thereof, each of said tines having a plurality of aligned apertures therein; toothed jaws formed on an edge face of each tine; and a chain having one end comprising a solid link pivotally mounted in the aperture and filling in the spaces between said tines and adjacent said jaws, said chain passed around and engaging the peripheral surface of said pipe, the link connecting pivot pins of the free end portion of said chain having projecting means engageable with means carried by said tines for adjustably securing the free end portion of said chain thereto, said jaws being formed to increase the bite of the chain on the pipe and themselves to bite into the pipe as the lever is moved in a direction to turn the pipe relative to a threaded member receiving it, the securing of the end link in the desired aperture controlling the amount of bite on the pipe.

7. In a lever for a chain wrench of the type described, a handle member; a chain comprising a plurality of grip links; and a pair of flat plates provided adjacent an end of said handle member, said plates forming a pair of parallel coextensive tines having on the adjacent surfaces thereof a plurality of aligned pin-receiving chain-securing keepers accessible from either side of the handle, each of said tines having a plurality of aligned spaced pin-receiving apertures formed therein forward of said keepers, an edge of each tine formed with a plurality of aligned spaced pin-receiving notches.

ELVIN A. HARTUNG.